US012113301B2

(12) United States Patent
Bhagavatula et al.

(10) Patent No.: US 12,113,301 B2
(45) Date of Patent: Oct. 8, 2024

(54) TILE-BASED PHASED-ARRAY ARCHITECTURE FOR MULTI-BAND PHASED-ARRAY DESIGN AND COMMUNICATION METHOD

(71) Applicant: Samsung Electronics Co., Ltd., Gyeonggi-do (KR)

(72) Inventors: Venumadhav Bhagavatula, Santa Clara, CA (US); Siu-Chuang Ivan Lu, San Jose, CA (US); Sang Won Son, Palo Alto, CA (US)

(73) Assignee: Samsung Electronics Co., Ltd (KR)

( * ) Notice: Subject to any disclaimer, the term of this patent is extended or adjusted under 35 U.S.C. 154(b) by 377 days.

(21) Appl. No.: 17/235,415

(22) Filed: Apr. 20, 2021

(65) Prior Publication Data
US 2022/0247077 A1    Aug. 4, 2022

Related U.S. Application Data

(60) Provisional application No. 63/144,222, filed on Feb. 1, 2021.

(51) Int. Cl.
*H04B 1/44* (2006.01)
*H01Q 5/307* (2015.01)
(Continued)

(52) U.S. Cl.
CPC .............. *H01Q 5/42* (2015.01); *H01Q 5/307* (2015.01); *H01Q 5/50* (2015.01); *H04B 1/005* (2013.01); *H04B 1/44* (2013.01)

(58) Field of Classification Search
CPC . H04B 1/44; H04B 1/005; H01Q 5/50; H01Q 5/307
See application file for complete search history.

(56) References Cited

U.S. PATENT DOCUMENTS 9,860,760 B2   1/2018   Tarighat Mehrabani et al.
9,960,883 B1   5/2018   Chakraborty
(Continued)

FOREIGN PATENT DOCUMENTS

WO   WO 2018/089008   5/2018

OTHER PUBLICATIONS

Shahramian et al. (a fully integrated 384-element, 16-tile, W-band phased array with self-alignment and self-test IEEE Journal of solid-state circuit, vol. 54, No. 9, Sep. 2019) (Year: 2019).*

(Continued)

*Primary Examiner* — Patrick C Chen
(74) *Attorney, Agent, or Firm* — The Farrell Law Firm, P.C.

(57) ABSTRACT

A radio frequency integrated circuit (RFIC) and method of communication are provided. The RFIC includes phased-locked loop (PLL) and data stream circuitry and a plurality of tiles in communication with the PLL and data stream circuitry. The plurality of tiles includes comprising at least one tile for each frequency band of the RFIC. The plurality of tiles are configured to communicate a data stream signal between tiles in a cascading sequence. Each tile of the plurality of tiles includes a plurality of up/down conversion mixers for converting the data stream signal between an intermediate frequency (IF) and a radio frequency (RF). Each tile also includes a plurality of front end (FE) elements, each in communication with a corresponding antenna and an up/down conversion mixer of the plurality of up/down conversion mixers.

20 Claims, 9 Drawing Sheets

(51) Int. Cl.
   *H01Q 5/42*   (2015.01)
   *H01Q 5/50*   (2015.01)
   *H04B 1/00*   (2006.01)

(56) References Cited

U.S. PATENT DOCUMENTS

| | | |
|---|---|---|
| 10,263,652 B2 | 4/2019 | Perumana et al. |
| 10,432,283 B2 | 10/2019 | Rainish et al. |
| 10,693,529 B1 | 6/2020 | Sissoev et al. |
| 2017/0025749 A1* | 1/2017 | Frye .................. H01Q 21/0025 |
| 2018/0166781 A1* | 6/2018 | Snyder .................. H01Q 21/08 |
| 2019/0081399 A1 | 3/2019 | Ku et al. |

OTHER PUBLICATIONS

Shahramian et al. (A 16-element W-band phased-array transceiver chipset with flip-chip PCB integrated antennas for multi-gigabit wireless data links) (Year: 2018).*

B. Sadhu, et.al., "A 28-GHz 32-Element TRX Phased-Array IC With Concurrent Dual-Polarized Operation and Orthogonal Phase and Gain Control for 5G Communications", in IEEE Journal of Solid-State Circuits, vol. 52, No. 12, pp. 3373-3391, 2015.

K. Kibaroglu, et al., "A 64-element 28-GHz phased-array transceiver with 52-dBm EIRP and 8-12-Gb/s 5G link at 300 meters without any calibration," IEEE Trans. Microw. Theory Techn., vol. 66, No. 12, pp. 5796-5811, Dec. 2018.

\* cited by examiner

TILE-BASED PHASED-ARRAY ARCHITECTURE FOR MULTI-BAND PHASED-ARRAY DESIGN AND COMMUNICATION METHOD

PRIORITY

This application is based on and claims priority under 35 U.S.C. § 119(e) to a U.S. Provisional Patent Application filed on Feb. 1, 2021 in the United States Patent and Trademark Office and assigned Ser. No. 63/144,222 the contents of which are incorporated herein by reference.

FIELD

The present disclosure relates generally to multi-band phased-arrays, and more particularly, to tile-based multi-band phased-arrays.

BACKGROUND

High-speed data transfer between mobile communication devices requires a high-bandwidth communication channel. $5^{th}$ Generation (5G) cellular technology has extended into the millimeter (mm)-wave frequency band to exploit the wide frequency bands that are available. Phased-array techniques refer to the employment of multiple transmitter/receiver antennas that are spaced at distances proportional to carrier wavelength. These techniques play a pivotal role in sustaining the mm-wave data links. As the high n260 frequency band (37-40 (GHz)) and low n257 frequency band (26.5-29.5 GHz) move toward greater commercialization, higher frequency bands (e.g., 47.2-48.2 GHz, 40-43 GHz, and 60 GHz) are also being developed.

Conventionally, phased-arrays employing a radio frequency (RF) phase-shifting architecture are implemented in a single-chip array or in a multi-chip modular phased-array.

Figure 1:
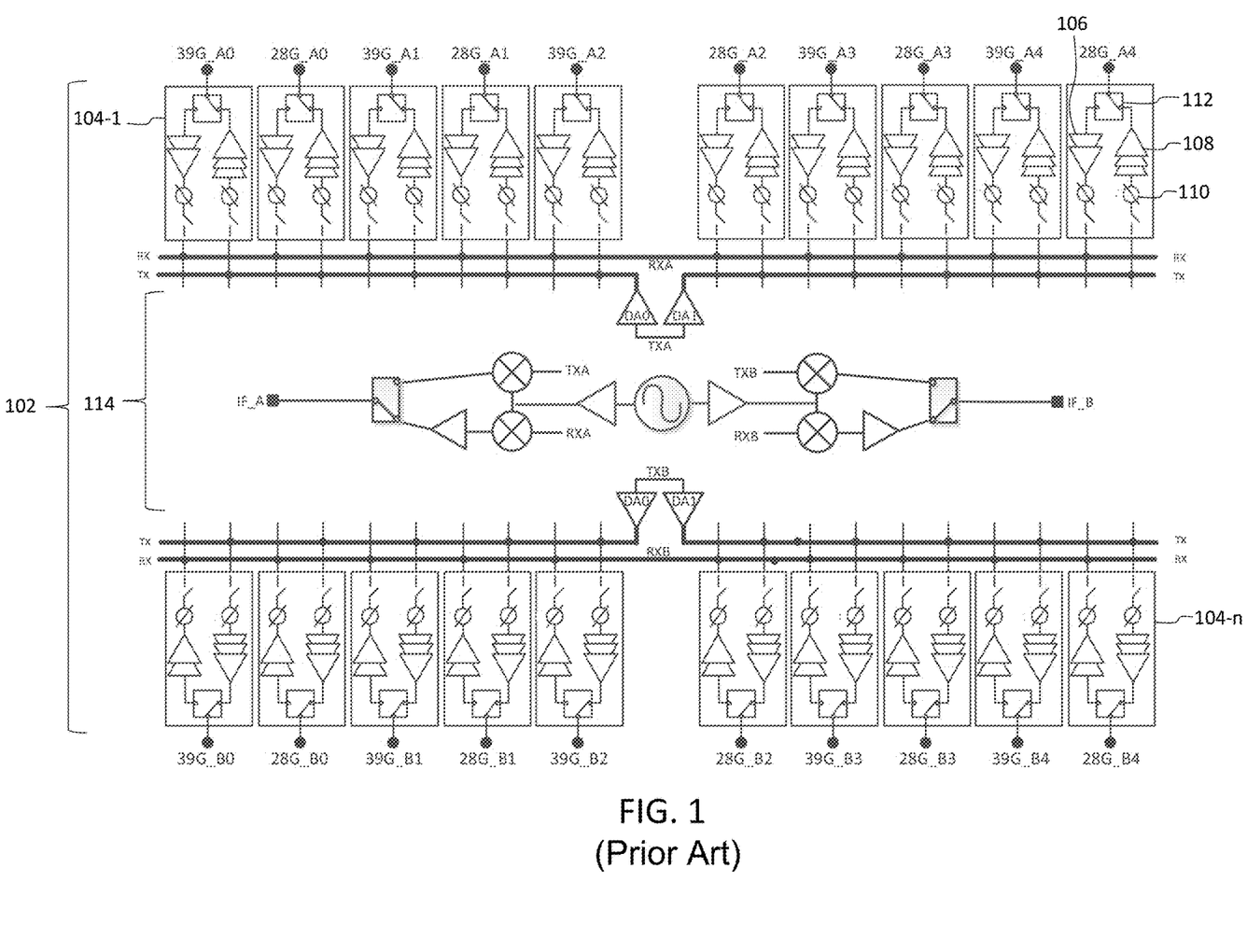
FIG. 1 is a diagram illustrating a single-chip CMOS phased-array.

FIG. 1 is a diagram illustrating a single-chip complementary metal oxide semiconductor (CMOS) phased array. A single phased-array chip 102 receives signals at an intermediate frequency (IF) from a center chip in a super-heterodyne architecture. The single phased-array chip 102 converts the signals from the IF to a radio frequency (RF), and transmits the signals over one or more antennas at the RF. Accordingly, the IF is the input frequency to the single phased-array chip 102, and the RF is the frequency at which the signals are transmitted and received at one or more antennas of the single phased-array chip 102.

The single phased-array chip 102 integrates all front-end (FE) elements 104-1 to 104-n that are required to drive the corresponding antennas. An FE element includes circuits that are repeated for each antenna. Specifically, each FE element includes a low-noise amplifier (LNA) 106, a power amplifier (PA) 108, phase-shifters (PS) 110, and a transmit/receive (T/R) switch 112. During transmission of data stream signals A and B, an on-chip distribution network (or data stream circuitry) 114 having an up/down conversion mixer converts the data stream signals A and B from an intermedia frequency (IF) to a radio frequency (RF) and provides the converted signals to the corresponding FEs 104-1 to 104-n. This architecture is amenable to small form factor solution because all radio elements, such as, for example, clock-generation circuits, calibration circuits, and micro-processors, are integrated onto the same die.

A conventional multi-chip phase-array may also be combined on a printed circuit board (PCB). A unit element on the PCB is a small beam former chip (e.g., a 2×2 or four-element core). Each beam former chip includes a PA, LNA, and PS only. The distribution network (data stream circuitry) and phase-locked loop (PLL) are not included in the beam former chip.

While the architecture on the PCB is more easily scalable than that of FIG. 1, it takes up a greater area due to the multi-chip approach. Consequently, the architecture of on the PCB is not suitable for mobile devices having a limited amount of area for components. Further, this architecture inherently consumes more power due to transitions between multiple chips and the PCB.

SUMMARY

According to one embodiment, a radio frequency integrated circuit (RFIC) is provided. The RFIC includes PLL and data stream circuitry and a plurality of tiles in communication with the PLL and data stream circuitry. The plurality of tiles includes at least one tile for each frequency band of the RFIC. The plurality of tiles are configured to communicate a data stream signal between tiles in a cascading sequence. Each tile of the plurality of tiles includes a plurality of up/down conversion mixers for converting the data stream signal between an IF and an RF. Each tile also includes a plurality of FE elements, each in communication with a corresponding antenna and an up/down conversion mixer of the plurality of up/down conversion mixers.

According to one embodiment, a method is provided for communicating a data stream signal via a RFIC. At least one data stream signal is received at one of a plurality of tiles of the RFIC. The plurality of tiles includes at least one tile for each frequency band of the RFIC. The plurality of tiles are configured to communicate between tiles in a cascading sequence. Each tile of the plurality of tiles includes a plurality of up/down conversion mixers and a plurality of FE elements. Each of the plurality of FE elements is in communication with a corresponding antenna and an up/down mixer of the plurality of up/down mixers. The at least one data stream signal is converted between an IF and an RF at the plurality of up/down conversion mixers of the one of the plurality of tiles.

BRIEF DESCRIPTION OF THE DRAWINGS

The above and other aspects, features, and advantages of certain embodiments of the present disclosure will be more apparent from the following detailed description, when taken in conjunction with the accompanying drawings, in which.

DETAILED DESCRIPTION

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate the existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "$1^{st}$," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may interchangeably be used with other terms, such as, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

Embodiments of the disclosure are directed to a phased-array architecture that supports multiple 5G mm-wave bands with a single phased-array RFIC. Specifically, embodiments provide a single-chip tile-based phased-array architecture. More specifically, a modular architecture is provided in which the phased-array is constructed by cascading tiles. Each band has a dedicated tile design (e.g., vertical tiles) for a multi-band phased-array.

Each tile includes up/down conversion mixers. Accordingly, a signal from each tile is combined at the IF, which is well suited for multi-band designs in which the RF frequency spans almost 24 GHz (e.g., 24.25-48 GHz), Embodiments may also be used with multi-band designs having RF frequency spans with upper limits that exceed 48 GHz.

The tile-based approach allows the signal distribution network (data stream circuitry) to be simplified compared to the conventional architecture of FIG. 1 that requires RF phase-shifting and RF signal combining. This simplification reduces loss in the distribution network and saves power.

The single-chip approach allows for integration of FE elements (i.e., those components disposed between the antenna and the mixer), a PLL, a calibration circuit, and a microprocessor within a compact die. Further, the tile-based approach allows for a scalable design in terms of band support.

Each tile includes FE elements and up/down conversion mixers. The tile-based approach uses RF or local oscillator (LO) phase-shifting with IF signal combining, as opposed to the RF phase-shifting and RF signal combining of the conventional architecture. Thus, signal combining is performed at IF, rather than RF. In a multi-band phased-array, the RF signal can extend one octave of bandwidth from 24.5 GHz to 47.5 GHz. Achieving a flat frequency response over such a large bandwidth results in higher power consumption. In an IF signal combining approach, the signal distribution is at a common IF for all bands, eliminating such power consumption concerns.

Figure 2:
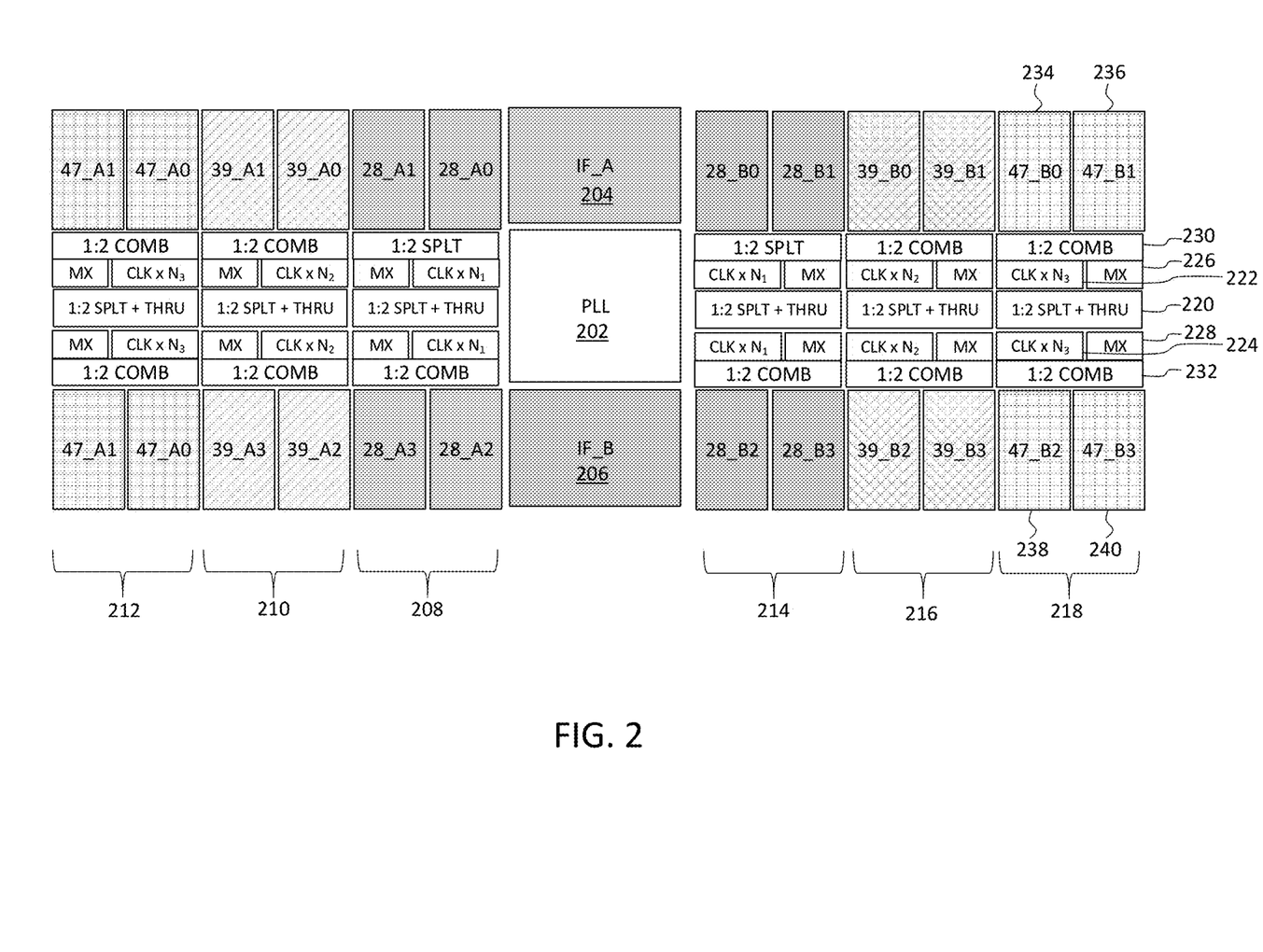
FIG. 2 is a diagram illustrating a tri-band multiple-input multiple-output (MIMO) phased-array RFIC, according to an embodiment.

FIG. 2 is a diagram illustrating a tri-band MIMO phased-array RFIC, according to an embodiment of the disclosure. Specifically, the tri-band of FIG. 2 relates to a low band (LB) 28, a high band (HB) 39, and an ultra-high band (UHB) 47.

For signal transmission via the RFIC, a PLL 202 and signal distribution circuitry (data stream circuitry) accept up to two data streams A and B at the IF (e.g., IF_A 204 and IF_B 206). Data streams A and B may be provided to the RFIC from a center chip in a super-heterodyne architecture. After amplification/buffering while in the IF the data streams A and B are distributed to tiles of the RFIC. Two tiles are provided for each of frequency bands 28, 39, and 47 (e.g., one tile for each data stream) resulting in a total of six tiles. The PLL 202 and signal distribution circuitry are preferably disposed at the center of the RFIC with tiles extending outwardly. Although FIG. 2 illustrates the tiles extending outwardly with increasing frequency bands, embodiments are not limited to such an arrangement and the tiles may be arranged in any order. For example, the tiles may extend outwardly with decreasing frequency bands.

IF_A 204 is distributed to first tile 208 of frequency band 28, second tile 210 of frequency band 39, and third tile 212 of frequency band 47. IF_B 204 is distributed to fourth tile 214 of frequency band 28, fifth tile 216 of frequency band 39, and sixth tile 218 of frequency band 47. While this embodiment illustrates six tiles and three specific frequency bands, any number of tiles may be provided representing any frequency band. Further, a single data stream may be provided only to half of the tiles, or the single data stream may be provided to all tiles.

Each tile includes a multiplexer/demultiplexer and two-way splitter/combiner 220 (i.e. 1:2) for distribution of the signal to top and bottom halves of the tile or for passing the signal through to a next adjacent tile in the cascading sequence of tiles. Each tile also includes first and second clock multiplier circuits 222 and 224, and first and second up/down conversion mixers 226 and 228, one of each pair for the top and bottom halves of the tile. The data stream is up-converted from an IF to an RF at the first and second up/down conversion mixers 226 and 228 using a clock frequency signal from the first and second clock multiplier circuits 222 and 124.

The top and bottom halves of the tile also include first and second two-way splitters/combiners 230 and 232 for distribution of the data stream signal to four FE elements. More specifically, the first two-way splitter/combiner 230 splits the data stream signal between first and second FE elements 234 and 236 at a top half of the tile, and the second two-way splitter/combiner 232 splits the data stream signal between third and fourth FE elements 238 and 240 at a bottom half of the tile. An FE element includes circuits that are repeated for each antenna of the tile.

For signal reception via the RFIC, data stream signals are received via the antennas of a tile and processed through the corresponding FE elements 234-240. Top half signals are combined at the first two-way splitter combiner 230, and bottom half signals are combined at the second two-way splitter combiner 232, before the respective combined signals are down-converted at the first and second up/down conversion mixers 226 and 228 using the clock frequency signal from the first and second clock multiplier circuits 222 and 224. Top and bottom half converted signals are combined at the two-way splitter/combiner 220 and through the multiplexer/demultiplexer passing it to the PLL and data stream circuitry, directly or via a previous adjacent tile in the cascading sequence of tiles.

Figure 3:
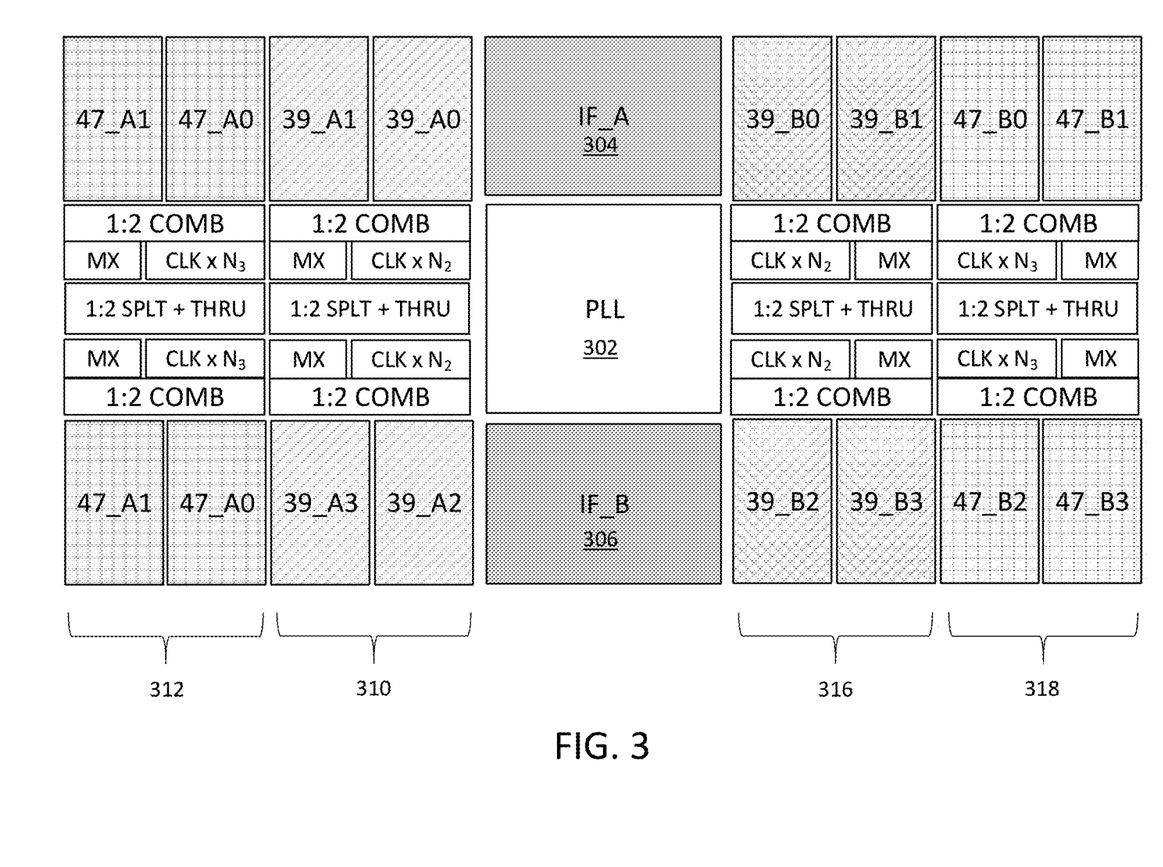
FIGS. 3 and 4 are diagrams illustrating dual-band MIMO phased-array RFICs, according to an embodiment.
Figure 4:
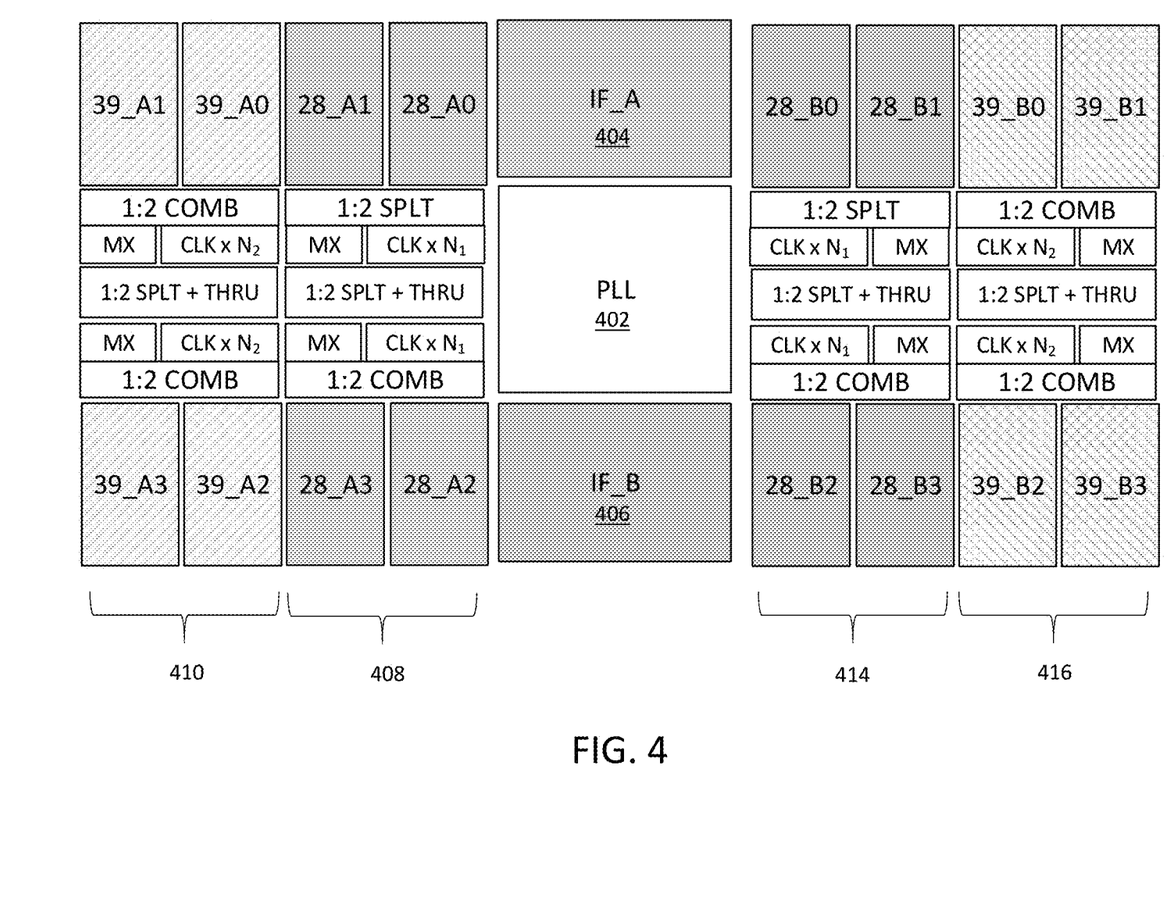

FIGS. 3 and 4 are diagrams illustrating dual-band MIMO phased-array RFICs, according to embodiments of the disclosure. Specifically, the dual-band of FIG. 3 relates to frequency bands 39 and 47, and the dual-band of FIG. 4 relates to frequency bands 28 and 39. Regarding scalability, the tiles are designed such that transitioning between tri-band/dual-band/single-band designs requires only removing unused tiles. Accordingly, components 302, 304, 306, 310, 312, 316, and 318 of FIG. 3 correspond to components 202, 204, 206, 210, 212, 216, and 218 described in detail above with respect to FIG. 2. FIG. 3 excludes tiles 208 and 214 corresponding to frequency band 28. Further, components 402, 404, 406, 408, 410, 414, and 416 of FIG. 4 correspond to components 202, 204, 206, 208, 210, 214, and 216 described in detail above with respect to FIG. 2. FIG. 4 excludes tiles 212 and 218 corresponding to frequency band 47.

Due to the fact that each tile of the RFIC is cascaded and self-contained without overlap, the tile-based approach relies upon proper signal/clock distribution.

Tiles of different frequency bands of the RFIC operate at different carrier frequencies ($F_{RF,BAND}$). However, a common intermediate frequency ($F_{IF}$) for a signal is applied to all of the tiles. Therefore, a clock frequency ($F_{CLK}=F_{RF,BAND}-F_{IF}$) for up/down-conversion mixers is also different for tiles of different frequency bands. To generate the different clock frequency, a common low-frequency reference clock input ($F_{REF}$) is distributed across the RFIC. Each tile accepts and buffers the reference clock input ($F_{REF}$), and sends the reference clock input ($F_{REF}$) to a next tile in the cascading sequence of tiles. The clock multiplier circuits in each tile generate the clock frequency ($F_{CLK}$) for the corresponding tile by multiplying the reference clock by a predefined value. A different predefined value may be preset for each tile.

According to an embodiment, one tile in the cascade of tiles on the RFIC is enabled at a time. When one tile is enabled from each of the left and right sides of the circuit, they are required to be for the same frequency band. Without inter-band carrier aggregation, the combiner structure is simplified.

Figure 5:
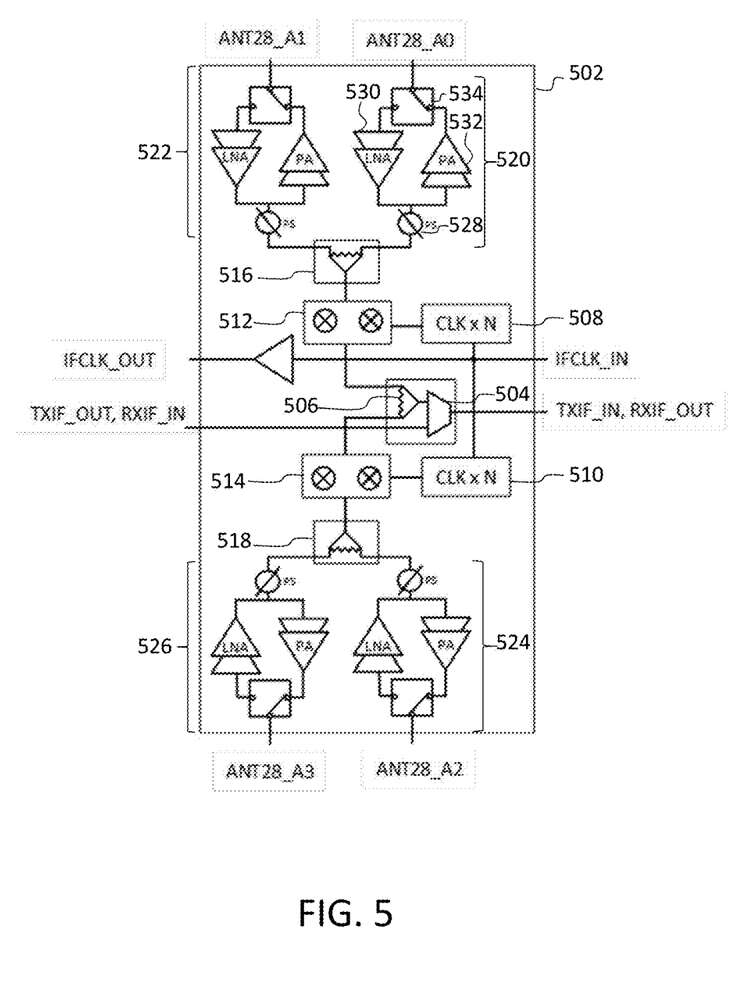
FIG. 5 is a diagram illustrating a structure of a single tile of an RFIC, according to an embodiment.

FIG. 5 is a diagram illustrating a structure of a single tile of an RFIC, according to an embodiment of the disclosure. Specifically, when the RFIC is utilized for transmission, FIG. 5 illustrates a single tile 502 for a frequency band 28 (LB) receiving a distributed IF signal A (data stream signal), which is input to a multiplexer/demultiplexer 504, used as a demultiplexer having one input line and two output lines (1:2). If the tile 502 corresponds to an active channel, the data stream signal is output from the demultiplexer 504 to a two-way splitter/combiner 506 having one input line and two output lines (1:2). The two output lines of the two-way splitter/combiner 506 distribute the data stream signal to top and bottom halves of the tile 502. If the tile 502 corresponds to an inactive channel, the data stream signal is output from the demultiplexer 504 to a through channel, which is output from an opposite end of the tile 502 to a next tile in the cascading sequence of tiles. The data stream signal continues to cascade through the plurality of tiles of the RFIC until it reaches a tile corresponding to an active channel.

The reference clock input ($F_{REF}$) is input to first and second clock multiplier circuits 508 and 510 in the top and bottom halves of the tile 502, and also output, via a through channel, from an opposite end of the tile 502 to a next tile in the cascading sequence of tiles. The reference clock input ($F_{REF}$) is provided to each tile of the RFIC. The first and second clock multiplier circuits 508 and 510 buffer the reference clock input ($F_{REF}$) and multiply the reference clock input ($F_{REF}$) by a predefined value N resulting in a clock frequency ($F_{CLK}$). Tiles are preset with different predefined values N to result in the proper clock frequency ($F_{CLK}$) for a given tile.

When the RFIC corresponds to an active channel during transmission, the first and second clock multiplier circuits 508 and 510 provide the clock frequency ($F_{CLK}$) to corresponding first and second up/down conversion mixers 512 and 514, one in each of the top and bottom halves of the tile 502. The first and second up/down conversion mixers 512 and 514 are also provided with the data stream signal from the two-way splitter/combiner 506. Using the clock frequency ($F_{CLK}$), the first and second up/down conversion mixers 512 and 514 up-convert the data stream signal from an IF to an RF operating at a carrier frequency ($F_{RF,BAND}$). The first up/down conversion mixer 512 provides the up-converted data stream signal to a first two-way splitter/combiner 516 that splits the data stream signal between first and second FE elements 520 and 522 of the tile 502. Similarly, the second up/down conversion mixer 514 provides the up-converted data stream signal to a second two-way splitter/combiner 518 that splits the data stream signal between third and fourth FE elements 524 and 526.

Each of the FE elements 520-526 includes a PS 528, an LNA 530, a PA 532, and a T/R switch 534. When the RFIC corresponds to an active channel during transmission, the data stream signal is provided through the PS 528, the PA 532, and the T/R switch 534 of each FE element, before being transmitted at the RF via a corresponding antenna. When the PS 528 is an RF PS, the tile uses a two up/down conversion mixers. When the PS 528 is an LO PS, the tile uses four up/down conversion mixers.

When the RFIC is utilized for reception of a data stream signal at the RF through the antennas of the tile 502 (e.g, the tile 502 corresponds to an active channel), the signal is provided through the T/R switch 534, the LNA 530, and the PS 528 of the FE elements 520-526. Data stream signals from the first and second FE elements 520 and 522 are combined at the first two-way splitter/combiner 516. Data stream signals from the third and fourth FE elements 524 and 526 are combined at the second two-way splitter/combiner 518. Combined data stream signals are provided from the first and second two-way splitter combiners 516 and 518 to the first and second up/down conversion mixers 512 and 514, which down-convert the data stream signals from the RF to the IF using the clock frequency ($F_{CLK}$) from the first and second clock multiplier circuits 508 and 510, respectively. The down-converted signals are provided from the first and second up/down conversion mixers 512 and 514 to the two-way splitter/combiner 506, which combines the down-converted signals. The multiplexer/demultiplexer 504, acts as a multiplexer and receives the combined signal from the two-way splitter/combiner 506, and outputs the combined signal from the tile 502. The signal is output from the tile 502 to a PLL and data stream circuitry of the RFIC, either directly or via one or more previous tiles in the cascading sequence of tiles in the RFIC.

When the RFIC is utilized for reception, but the tile 502 corresponds to an inactive channel, the multiplexer 504 receives a signal from a subsequent tile in the cascading sequence, and the multiplexer 504 passes this signal through to the PLL and data stream circuitry of the RFIC, either directly or via one or more previous tiles in the cascading sequence of tiles in the RFIC.

Figure 6:
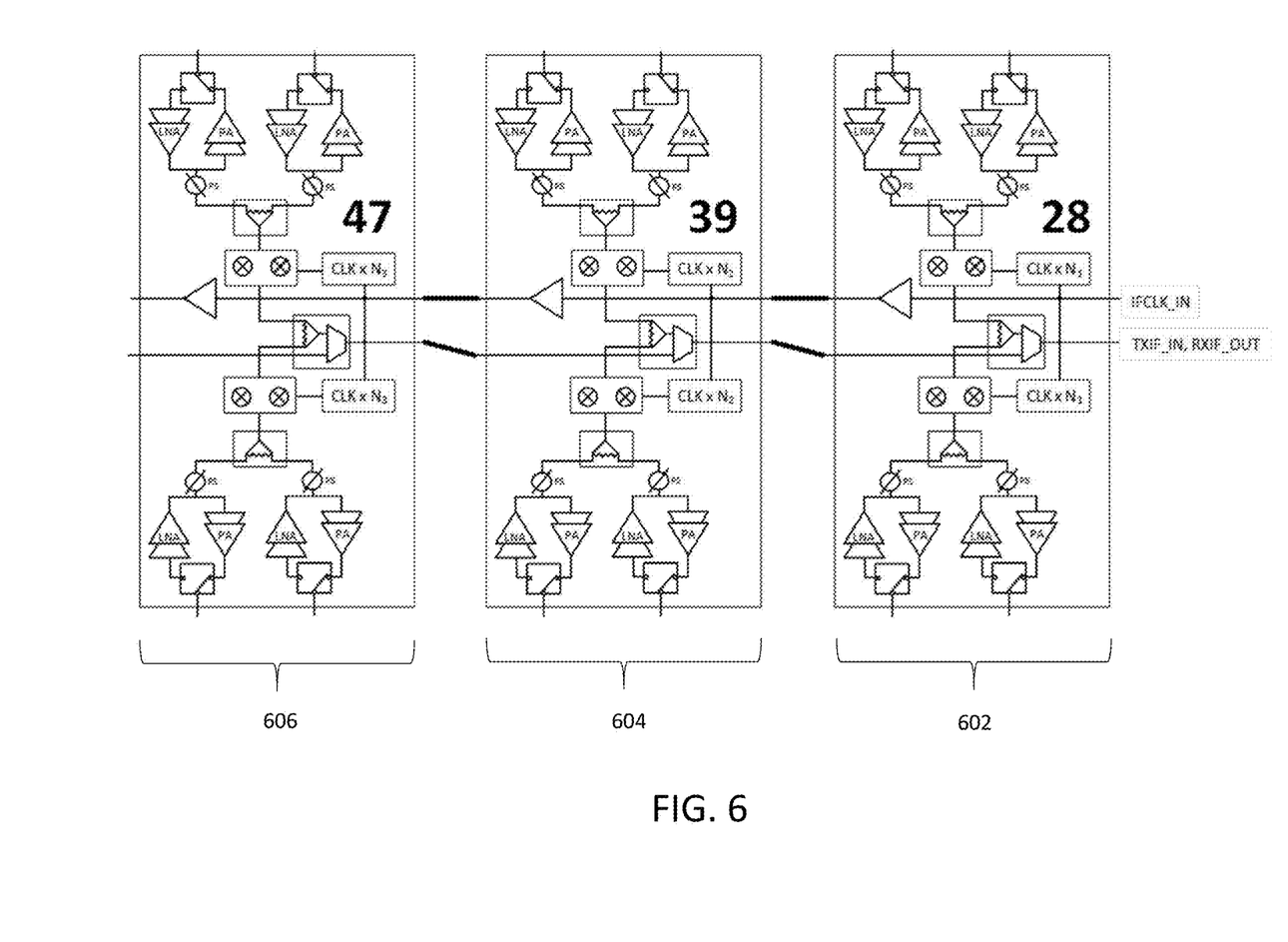
FIG. 6 is a diagram illustrating multiple cascaded tiles of an RFIC, according to an embodiment.

FIG. 6 is a diagram illustrating multiple cascaded tiles of an RFIC, according to an embodiment of the disclosure. Specifically, FIG. 6 illustrates a cascade of a first tile 602 for frequency band 28 (LB), a second tile 604 for frequency band 39 (HB), and a third tile 606 for frequency band 47 (UHB). Each tile has a structure and components corresponding to those described in detail above with respect to FIG. 5.

When the RFIC is transmitting a data stream signal, the reference clock input ($F_{REF}$) and the data stream signal are provided in a cascading fashion from tile to tile. Specifically, the reference clock input ($F_{REF}$) is cascaded through each of the first through third tiles 602-606, while the data stream signal cascades through the tiles corresponding to inactive channels until a tile corresponding to an active channel is reached.

When the RFIC is receiving a data stream signal, the reference clock input ($F_{REF}$) is provided in the same cascading fashion from tile to tile. When the data stream signal is received through the antennas of the third tile 606, the signal is output from the third tile 606 and cascaded in a reverse direction through the second tile 604 and the first tile 602 before reaching the PLL and data stream circuitry of the RFIC. When the data stream signal is received through the antennas of the second tile 604, the signal is output from the second tile 604 and cascaded in a reverse direction through the first tile 602 before reaching the PLL and data stream circuity of the RFIC. When the data stream signal is received through the antennas of the first tile 602, the signal is output from the first tile 602 to the PLL and data stream circuitry of the RFIC.

Each tile is has a different predefined value $N_1, N_2, N_3$, for use in their respective clock multiplier circuits. Accordingly, each tile may have a different clock frequency ($F_{CLK}$) and operates at a different carrier frequency ($F_{RF,BAND}$).

Figure 7:
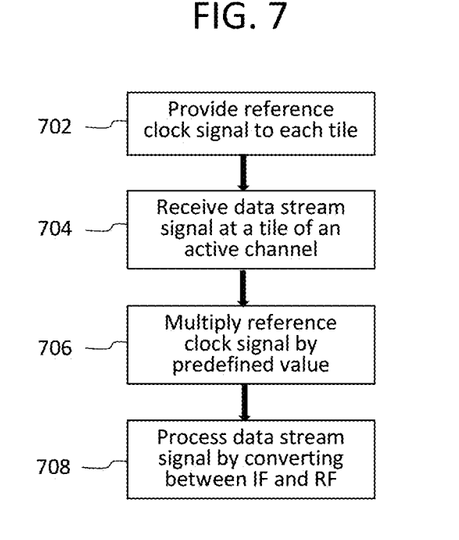
FIG. 7 is a flow chart illustrating a method for communicating a data stream signal via an RFIC, according to an embodiment.

Referring to FIG. 7, a flow chart illustrates a method for communicating a data stream signal via an RFIC, according to an embodiment of the disclosure. At 702, a reference clock signal is provided to each tile of the RFIC in a cascading sequence. The RFIC includes a pair of tiles for each frequency band of the RFIC. At 704, a data stream signal is received at a tile of the RFIC. At 706, the reference clock signal is multiplied by a predefined value at clock multiplier circuits of the tile to generate a clock frequency for the tile. At 708, the data stream signal is processed and converted between IF and RF at up/down conversion mixers of the tile using the clock frequency of the tile. The tile corresponds to an active channel.

Figure 8:
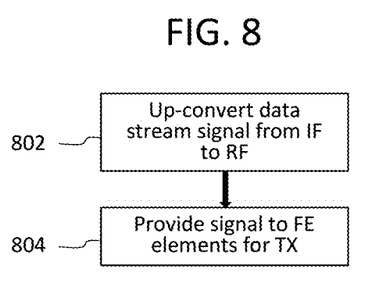
FIG. 8 is a flow chart illustrating a method for processing a data stream signal for communication via an RFIC, according to an embodiment.

FIG. 8 is a flow chart illustrating a method for processing a data stream signal for communication via an RFIC, according to an embodiment of the disclosure. Specifically, the method of FIG. 8 is a detailed description of 708 of FIG. 7, when the RFIC is transmitting a data stream signal and the data stream signal is provided to the tile from a PLL and data stream circuity of the RFIC. At 802, the data stream signal received at the tile is up-converted from an IF to an RF at the up/down conversion mixers of the tile using the clock frequency of the tile. At 804, the up-converted data stream signal is provided to FE elements of the tile for transmission over corresponding antennas.

Figure 9:
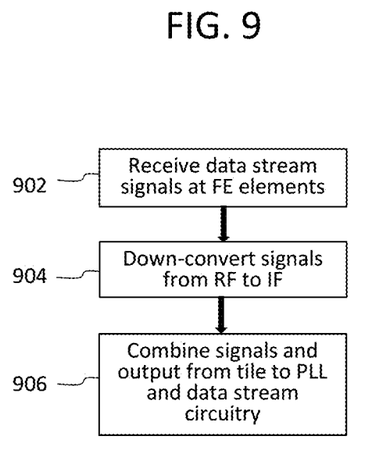
FIG. 9 is a flow chart illustrating a method for processing a data stream signal for communication via an RFIC, according to another embodiment.

FIG. 9 is a flow chart illustrating a method for processing a data stream signal for communication via an RFIC, according to another embodiment of the disclosure. Specifically, the method of FIG. 9 is a detailed description of 708 of FIG. 7, when the RFIC is receiving a data stream signal. At 902, data stream signals are received via antennas and corresponding FE elements of the tile. At 904, the data stream signals are down-converted from RF to IF at the up/down conversion mixers based on the clock frequency from the clock multiplier circuits. At 906, the down-converted data stream signals are combined and the combined data stream signal is output from the tile to a PLL and data stream circuitry of the RFIC, either directly or via one or more previous tiles in the cascading sequence of tiles of the RFIC.

Figure 10:
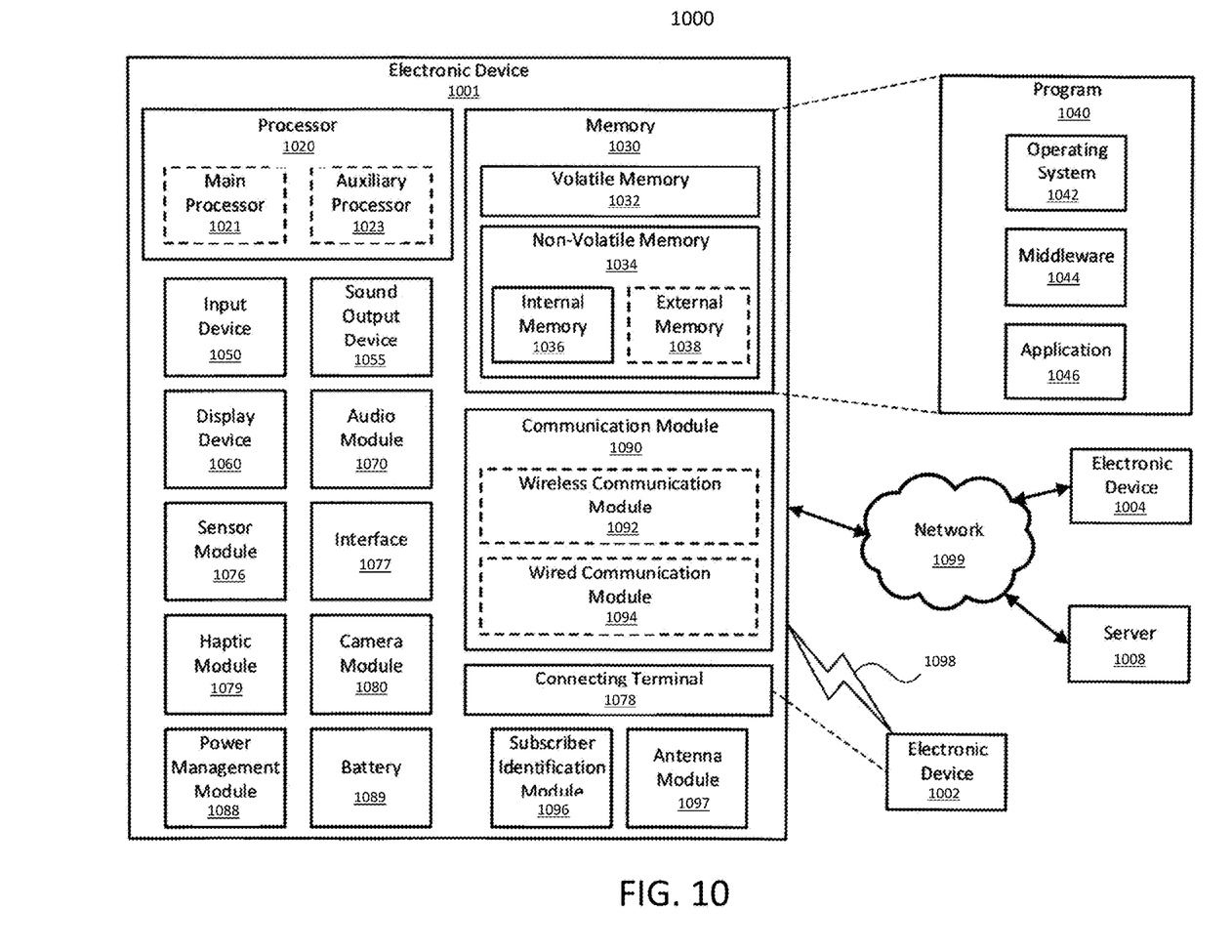
FIG. 10 is a block diagram of an electronic device in a network environment, according to an embodiment.

FIG. 10 is a block diagram of an electronic device in a network environment, according to one embodiment. Referring to FIG. 10, an electronic device 1001 in a network environment 1000 may communicate with an electronic device 1002 via a first network 1098 (e.g., a short-range wireless communication network), or an electronic device 1004 or a server 1008 via a second network 1099 (e.g., a long-range wireless communication network). The electronic device 1001 may communicate with the electronic device 1004 via the server 1008. The electronic device 1001 may include a processor 1020, a memory 1030, an input device 1050, a sound output device 1055, a display device 1060, an audio module 1070, a sensor module 1076, an interface 1077, a haptic module 1079, a camera module 1080, a power management module 1088, a battery 1089, a communication module 1090, a subscriber identification module (SIM) 1096, or an antenna module 1097. In one embodiment, at least one (e.g., the display device 1060 or the camera module 1080) of the components may be omitted from the electronic device 1001, or one or more other components may be added to the electronic device 1001. Some of the components may be implemented as a single integrated circuit (IC). For example, the sensor module 1076 (e.g., a fingerprint sensor, an iris sensor, or an illuminance sensor) may be embedded in the display device 1060 (e.g., a display).

The processor 1020 may execute, for example, software (e.g., a program 1040) to control at least one other component (e.g., a hardware or a software component) of the electronic device 1001 coupled with the processor 1020, and may perform various data processing or computations. As at least part of the data processing or computations, the processor 1020 may load a command or data received from another component (e.g., the sensor module 1076 or the communication module 1090) in volatile memory 1032, process the command or the data stored in the volatile memory 1032, and store resulting data in non-volatile memory 1034. The processor 1020 may include a main processor 1021 (e.g., a central processing unit (CPU) or an application processor (AP)), and an auxiliary processor 1023 (e.g., a graphics processing unit (GPU), an image signal processor (ISP), a sensor hub processor, or a communication processor (CP)) that is operable independently from, or in conjunction with, the main processor 1021. Additionally or alternatively, the auxiliary processor 1023 may be adapted to consume less power than the main processor 1021, or execute a particular function. The auxiliary processor 1023 may be implemented as being separate from, or a part of, the main processor 1021.

The auxiliary processor 1023 may control at least some of the functions or states related to at least one component (e.g., the display device 1060, the sensor module 1076, or the communication module 1090) among the components of the electronic device 1001, instead of the main processor 1021 while the main processor 1021 is in an inactive (e.g., sleep) state, or together with the main processor 1021 while the main processor 1021 is in an active state (e.g., executing an application). The auxiliary processor 1023 (e.g., an image signal processor or a communication processor) may be implemented as part of another component (e.g., the camera module 1080 or the communication module 1090) functionally related to the auxiliary processor 1023.

The memory 1030 may store various data used by at least one component (e.g., the processor 1020 or the sensor module 1076) of the electronic device 1001. The various data may include, for example, software (e.g., the program 1040) and input data or output data for a command related thereto. The memory 1030 may include the volatile memory 1032 or the non-volatile memory 1034.

The program 1040 may be stored in the memory 1030 as software, and may include, for example, an operating system (OS) 1042, middleware 1044, or an application 1046.

The input device 1050 may receive a command or data to be used by other component (e.g., the processor 1020) of the electronic device 1001, from the outside (e.g., a user) of the electronic device 1001. The input device 1050 may include, for example, a microphone, a mouse, or a keyboard.

The sound output device 1055 may output sound signals to the outside of the electronic device 1001. The sound output device 1055 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 1060 may visually provide information to the outside (e.g., a user) of the electronic device 1001. The display device 1060 may include, for example, a display, a hologram device, or a projector and control circuitry to control a corresponding one of the display, hologram device, and projector. The display device 1060 may include touch circuitry adapted to detect a touch, or sensor circuitry (e.g., a pressure sensor) adapted to measure the intensity of force incurred by the touch.

The audio module 1070 may convert a sound into an electrical signal and vice versa. The audio module 1070 may obtain the sound via the input device 1050, or output the sound via the sound output device 1055 or a headphone of an external electronic device 1002 directly (e.g., wired) or wirelessly coupled with the electronic device 1001.

The sensor module 1076 may detect an operational state (e.g., power or temperature) of the electronic device 1001 or an environmental state (e.g., a state of a user) external to the electronic device 1001, and then generate an electrical signal or data value corresponding to the detected state. The sensor module 1076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1077 may support one or more specified protocols to be used for the electronic device 1001 to be coupled with the external electronic device 1002 directly (e.g., wired) or wirelessly. The interface 1077 may include, for example, a high definition multimedia interface (HDMI), a universal serial bus (USB) interface, a secure digital (SD) card interface, or an audio interface.

A connecting terminal 1078 may include a connector via which the electronic device 1001 may be physically connected with the external electronic device 1002. The connecting terminal 1078 may include, for example, an HDMI connector, a USB connector, an SD card connector, or an audio connector (e.g., a headphone connector).

The haptic module 1079 may convert an electrical signal into a mechanical stimulus (e.g., a vibration or a movement) or an electrical stimulus which may be recognized by a user via tactile sensation or kinesthetic sensation. The haptic module 1079 may include, for example, a motor, a piezoelectric element, or an electrical stimulator.

The camera module 1080 may capture a still image or moving images. The camera module 1080 may include one or more lenses, image sensors, image signal processors, or flashes.

The power management module 1088 may manage power supplied to the electronic device 1001. The power management module 1088 may be implemented as at least part of, for example, a power management integrated circuit (PMIC).

The battery 1089 may supply power to at least one component of the electronic device 1001. The battery 1089 may include, for example, a primary cell which is not rechargeable, a secondary cell which is rechargeable, or a fuel cell.

The communication module 1090 may support establishing a direct (e.g., wired) communication channel or a wireless communication channel between the electronic device 1001 and the external electronic device (e.g., the electronic device 1002, the electronic device 1004, or the server 1008) and performing communication via the established communication channel. The communication module 1090 may include one or more communication processors that are operable independently from the processor 1020 (e.g., the AP) and supports a direct (e.g., wired) communication or a wireless communication. The communication module 1090 may include a wireless communication module 1092 (e.g., a cellular communication module, a short-range wireless communication module, or a global navigation satellite system (GNSS) communication module) or a wired communication module 1094 (e.g., a local area network (LAN) communication module or a power line communication (PLC) module). A corresponding one of these communication modules may communicate with the external electronic device via the first network 1098 (e.g., a short-range communication network, such as Bluetooth™, wireless-fidelity (Wi-Fi) direct, or a standard of the Infrared Data Association (IrDA)) or the second network 1099 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple IC's) that are separate from each other. The wireless communication module 1092 may identify and authenticate the electronic device 1001 in a communication network, such as the first network 1098 or the second network 1099, using subscriber information (e.g., international mobile subscriber identity (IMSI)) stored in the subscriber identification module 1096.

The antenna module 1097 may transmit or receive a signal or power to or from the outside (e.g., the external electronic device) of the electronic device 1001. The antenna module 1097 may include one or more antennas, and, therefrom, at least one antenna appropriate for a communication scheme used in the communication network, such as the first network 1098 or the second network 1099, may be selected, for example, by the communication module 1090 (e.g., the wireless communication module 1092). The signal or the power may then be transmitted or received between the communication module 1090 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

Commands or data may be transmitted or received between the electronic device 1001 and the external electronic device 1004 via the server 1008 coupled with the second network 1099. Each of the electronic devices 1002 and 1004 may be a device of a same type as, or a different type, from the electronic device 1001. All or some of operations to be executed at the electronic device 1001 may be executed at one or more of the external electronic devices 1002, 1004, or 1008. For example, if the electronic device 1001 should perform a function or a service automatically, or in response to a request from a user or another device, the electronic device 1001, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1001. The electronic device 1001 may provide the outcome, with or without further processing of the outcome, as at least part of a reply to the request. To that end, a cloud computing, distributed computing, or client-server computing technology may be used, for example.

One embodiment may be implemented as software (e.g., the program 1040) including one or more instructions that are stored in a storage medium (e.g., internal memory 1036 or external memory 1038) that is readable by a machine (e.g., the electronic device 1001). For example, a processor of the electronic device 1001 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A radio frequency integrated circuit (RFIC) comprising:
   phase-locked loop (PLL) and data stream circuitry;
   a plurality of tiles in communication with the PLL and data stream circuitry, wherein the plurality of tiles comprise at least one tile for each frequency band of the RFIC, wherein the plurality of tiles are configured to communicate a data stream signal through adjacent tiles of the plurality of tiles in a cascading sequence, and wherein each tile of the plurality of tiles comprises:
      a plurality of up/down conversion mixers for converting the data stream signal between an intermediate frequency (IF) and a radio frequency (RF); and
      a plurality of front end (FE) elements, each in communication with a corresponding antenna and an up/down conversion mixer of the plurality of up/down conversion mixers,
   wherein the RFIC is a single-chip phased-array RFIC.

2. The RFIC of claim 1, wherein:
   the PLL and data stream circuitry provides a reference clock signal to each tile in the cascading sequence; and
   each tile further comprises a plurality of clock multiplier circuits, and when a given tile of the plurality of tiles receives the reference clock signal:
      the plurality of clock multiplier circuits multiply the reference clock signal by a predefined value to generate a respective clock frequency for the given tile; and
      the given tile provides the reference clock signal to a next tile in the cascading sequence via a first through channel.

3. The RFIC of claim 2, wherein tiles of different frequency bands are preset with different predefined values.

4. The RFIC of claim 2, wherein each tile further comprises a demultiplexer, and when the given tile receives the data stream signal from the PLL and data stream circuitry in the cascading sequence:
   the demultiplexer provides the data stream signal to the next tile in the cascading sequence via a second through channel when the given tile corresponds to an inactive channel, and provides the data stream signal to the plurality of up-down conversion mixers when the given tile corresponds to an active channel.

5. The RFIC of claim 4, wherein each tile further comprises a two-way splitter/combiner, and when the given tile corresponds to the active channel:
   the two-way splitter/combiner receives the data stream signal from the demultiplexer, and splits the data stream signal between the plurality of up/down conversion mixers; and
   the plurality of up/down conversion mixers up-converts the data stream signals from the IF to the RF based on the clock frequency from the clock multiplier circuits.

6. The RFIC of claim 5, wherein each of the plurality of FE elements comprises a phase shifter, a power amplifier, a low-noise amplifier, and a transmit/receive switch.

7. The RFIC of claim 6, wherein:
   the two-way splitter/combiner splits the data stream signal between two up/down conversion mixers, when the phase shifter is an RF phase shifter; and
   the two-way splitter/converter splits the data stream signal between four up/down conversion mixers, when the phase shifter is a local oscillator (LO) phase shifter.

8. The RFIC of claim 6, wherein each tile further comprises:
   a two-way splitter/combiner that combines converted data stream signals from the plurality of up/down conversion mixers; and
   a multiplexer that receives the combined converted data signal from the two-way splitter/combiner and outputs the combined converted data signal to the PLL and data stream circuitry, directly or via a previous tile in the cascading sequence.

9. The RFIC of claim 5, wherein each tile further comprises a pair of two-way splitters/combiners that split the converted data stream signals to the plurality of FE elements for transmission of the converted data stream signals over the corresponding antennas.

10. The RFIC of claim 2, wherein each tile further comprises a pair of two-way splitters/combiners, and when the given tile receives data stream signals from the corresponding antennas:
    the plurality of FE elements provide the data stream signals to the pair of two-way splitters/combiners that combine the data stream signals; and
    the pair of two-way splitters/combiners provide the combined data stream signals to the plurality of up/down conversion mixers that down-convert the combined data stream signals from the RF to the IF based on the clock frequency from the clock multiplier circuits.

11. The RFIC of claim 10, wherein each of the plurality of FE elements comprises a phase shifter, a power amplifier, a low-noise amplifier, and a transmit/receive switch.

12. The RFIC of claim 11, wherein:
    the combined data stream signals are provided to two up/down conversion mixers, when the phase shifter is an RF phase shifter; and
    the combined data stream signals are provided to four up/down conversion mixers, when the phase shifter is an LO phase shifter.

13. A method for communicating a data stream signal via a radio frequency integrated circuit (RFIC), the method comprising:
    receiving at least one data stream signal at one of a plurality of tiles of the RFIC, wherein the plurality of tiles comprises at least one tile for each frequency band of the RFIC, the plurality of tiles are configured to communicate through adjacent tiles of the plurality of tiles in a cascading sequence, and each tile of the plurality of tiles comprises a plurality of up/down conversion mixers and a plurality of front end (FE) elements, each of the plurality of FE elements being in communication with a corresponding antenna and an up/down conversion mixer of the plurality of up/down conversion mixers; and converting the at least one data stream signal between an intermediate frequency (IF) and a radio frequency (RF) at the plurality of up/down conversion mixers of the one of the plurality of tiles, wherein the RFIC is a single-chip phased-array RFIC.

14. The method of claim 13, further comprising:

providing a reference clock signal from phase-locked loop (PLL) and data stream circuitry of the RFIC to each tile in the cascading sequence; and when a given tile of the plurality of tiles receives the reference clock signal:

multiplying the reference clock signal by a predefined value at a plurality of clock multiplier circuits to generate a respective clock frequency for the given tile; and providing the reference clock signal to a next tile in the cascading sequence via a first through channel.

15. The method of claim 14, wherein tiles of different frequency bands are preset with different predefined values.

16. The method of claim 14, wherein the at least one data stream signal is transmitted via the RFIC, and receiving the at least one data stream signal comprises:

providing a data stream signal from the PLL and data stream circuitry of the RFIC to one or more of a plurality of tiles of the RFIC in the cascading sequence.

17. The method of claim 16, wherein converting the at least one data stream signal comprises:

when the given tile corresponds to an active channel:

up-converting the data stream signal from the IF to the RF at the plurality of up/down conversion mixers based on the clock frequency from the clock multiplier circuits; and providing the up-converted data stream signal to the plurality of FE elements for transmission over the corresponding antennas; and when the given tile corresponds to an inactive channel, providing the data stream signal to a next tile in the cascading sequence via a second through channel.

18. The method of claim 14, wherein the at least one data stream signal is received via the RFIC, and receiving the at least one data stream signal comprises:

receiving data stream signals via antennas and corresponding FE elements of the one of the plurality of tiles of the RFIC.

19. The method of claim 18, wherein converting the at least one data stream signal comprises:

down-converting the data stream signals from the RF to the IF at the plurality of up/down conversion mixers based on the clock frequency from the clock multiplier circuits.

20. The method of claim 19, further comprising:

combining the down-converted data stream signals at a combiner to generate a combined data stream signal;

transmitting the combined data stream signal to the PLL and data stream circuitry, directly or via a previous tile in the cascading sequence.

* * * * *